Nov. 19, 1935.  P. LIRA  2,021,560

CINEMATOGRAPHIC MECHANISM

Filed May 20, 1935  7 Sheets—Sheet 1

P. Lira

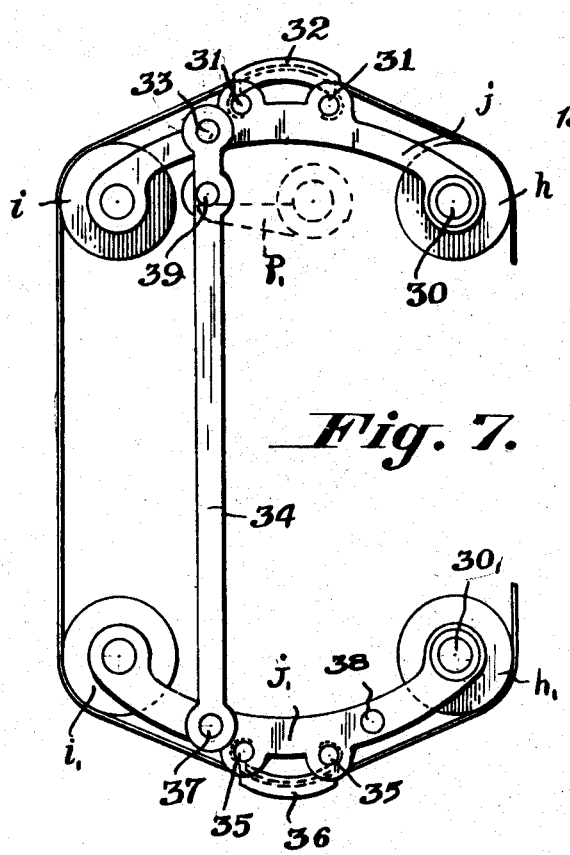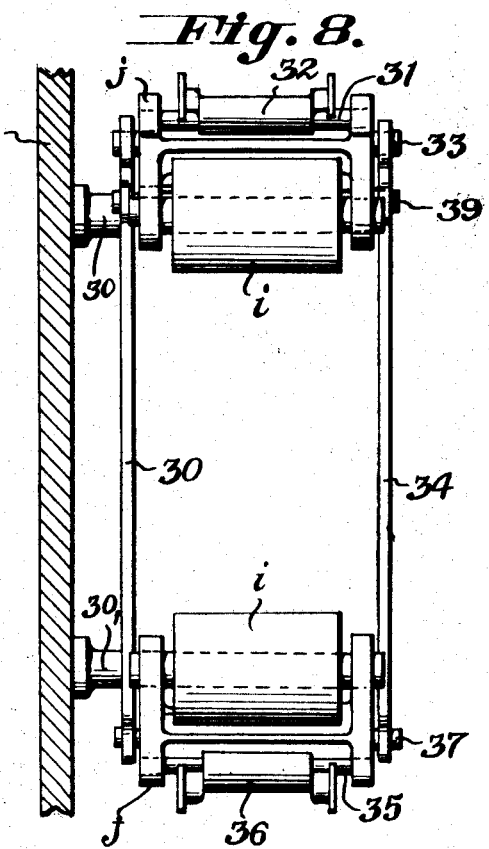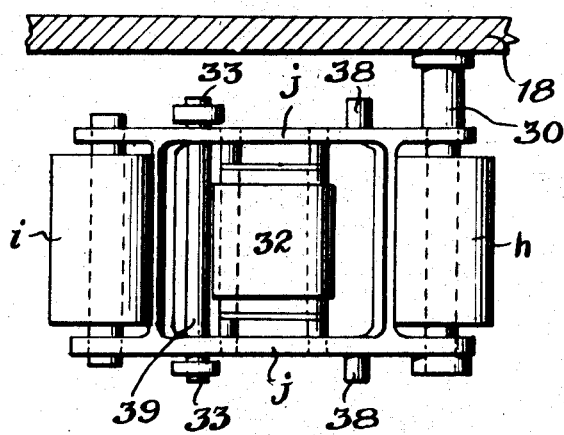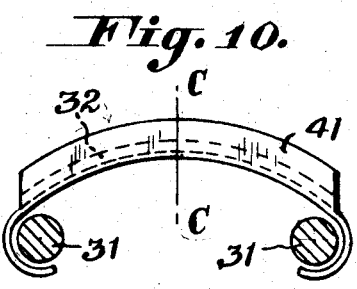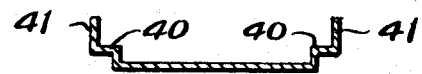

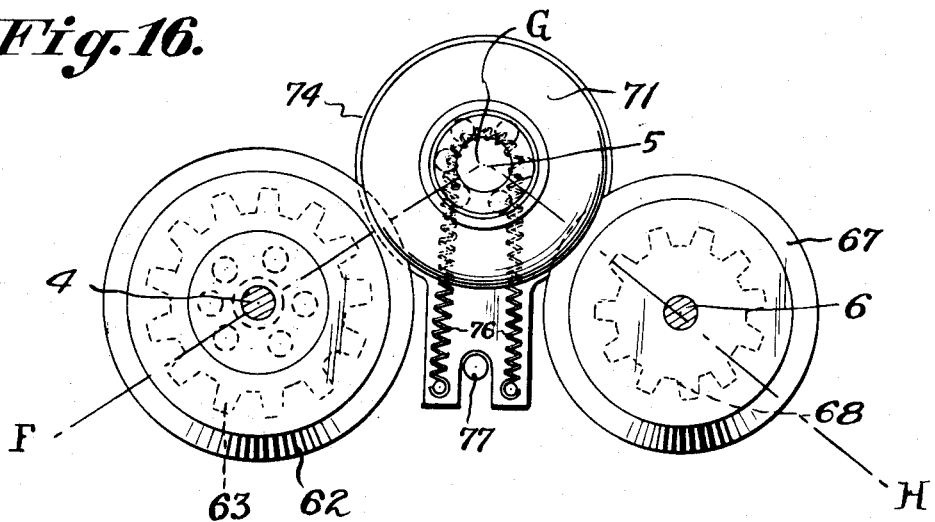
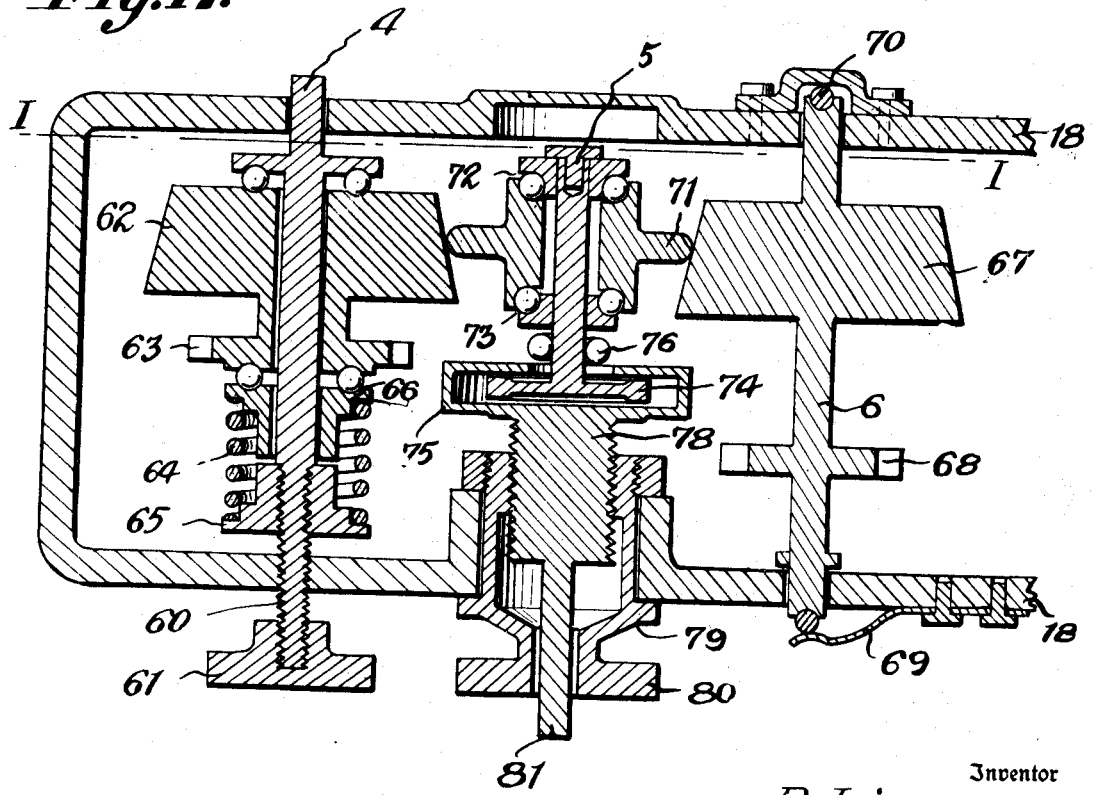

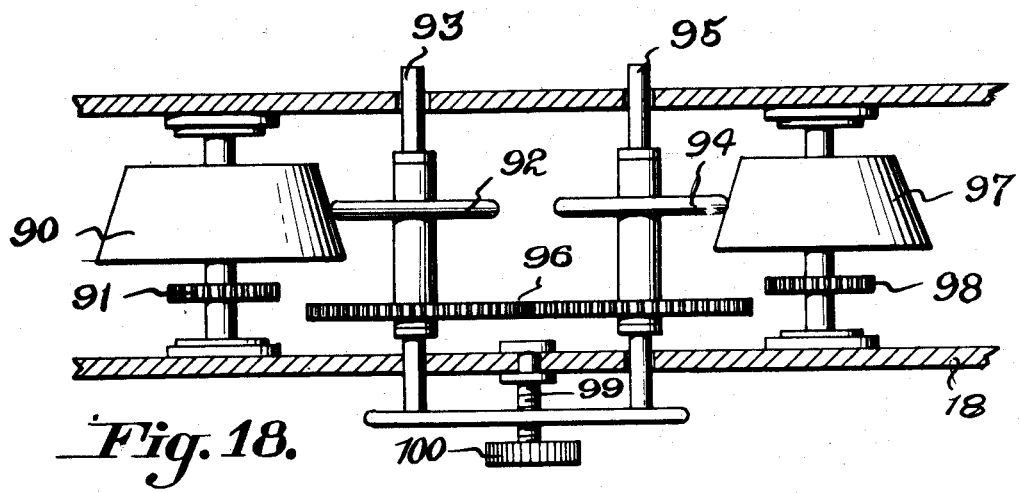
_Fig. 18._
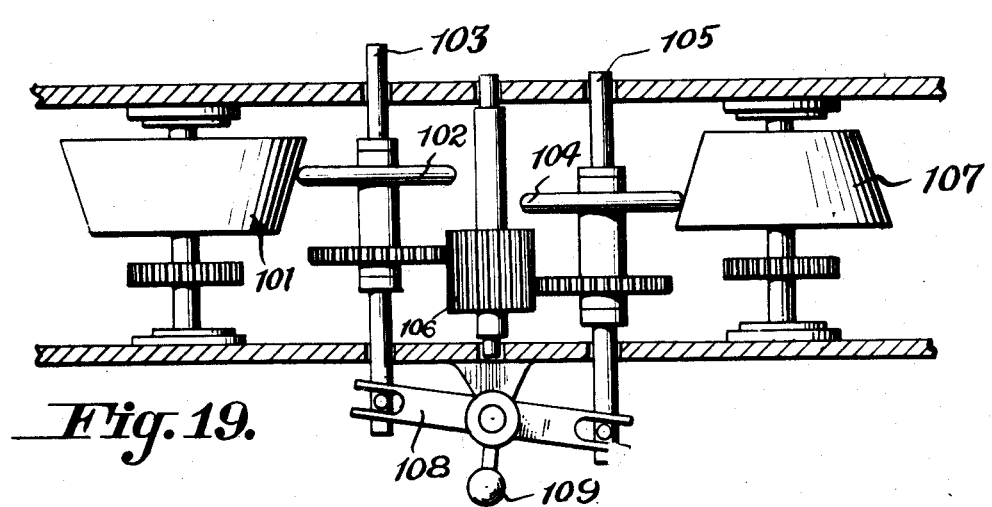
_Fig. 19._
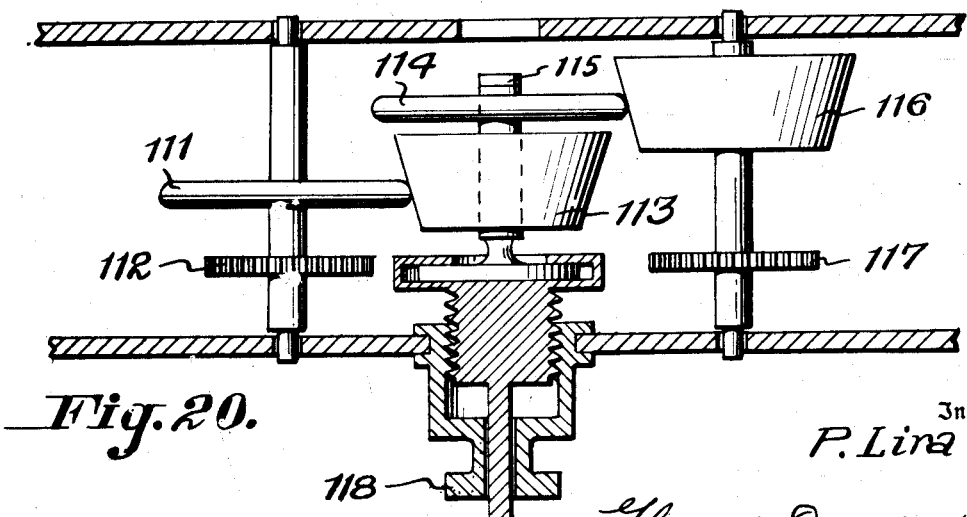
_Fig. 20._

UNITED STATES PATENT OFFICE 2,021,560

CINEMATOGRAPHIC MECHANISM

Pedro Lira, Santiago, Chile

Application May 20, 1935, Serial No. 22,479

11 Claims. (Cl. 271—2.2)

My invention relates to improvements in the cinematographic mechanism described in my Patent No. 1,992,706, granted the 26th of February 1935.

Said improvements are specially designed for cine-projectors and refers to the following points:
  (a) The lateral guiding of the film.
  (b) The uniform and continuous driving of the film.
  (c) The reciprocating film carrier or "oscillator" device.
  (d) The device for applying the spring action to the oscillator.
  (e) The counterbalance of the reciprocating film carrier movement, so as to avoid the vibrations of the whole cine-projector due to the inertia of the reciprocating parts; and
  (f) The differential friction gearing between the camshaft and the film-driving shaft, or differential corrector.

The object of my invention is to secure a silent, steady and vibrationless running of the whole mechanism.

I attain these objects by means of the mechanisms shown in the accompanying drawings, wherein:

Figure 3 is a side view and Figure 4 is a section on the line A—A of Figure 3.

Figure 5 is a side view and Figure 6 is a section on the line B—B of Figure 5.

Figures 7, 8, 9, 10 and 11 show an improved embodiment of the reciprocating film carrier or oscillator which I named "parallel oscillator" in the specifications of my Patent No. 1,992,706, and of which: Figure 7 is a side view, Figure 8 is a front elevation partly in section, Figure 9 is a plan view of Fig. 7, partly in section, Figure 10 is an enlarged side view partly in section of a portion of the film support and Figure 11 is a section on the line C—C of Figure 10.

Figure 12:
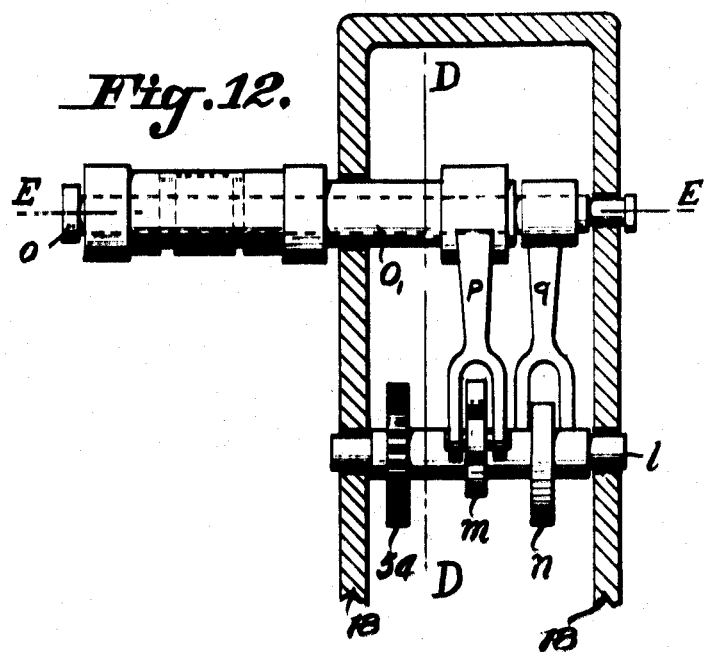
Figure 13:
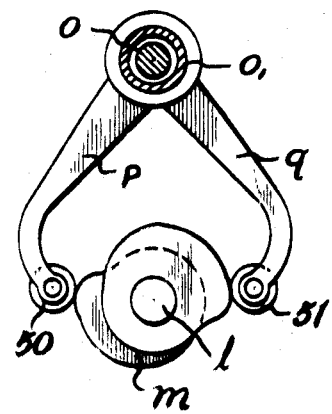
Figure 14:
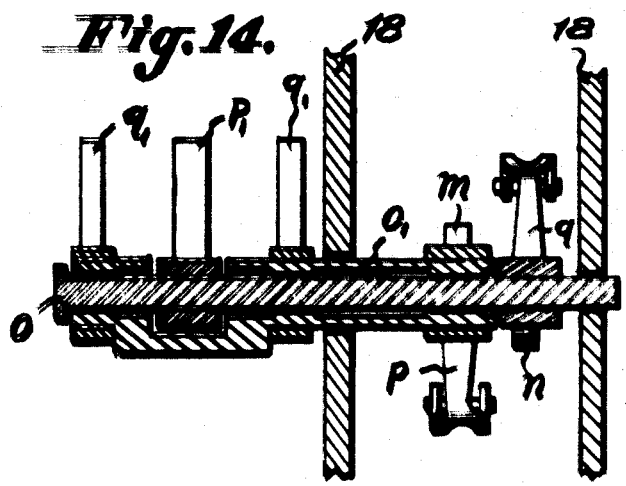
Figure 15:
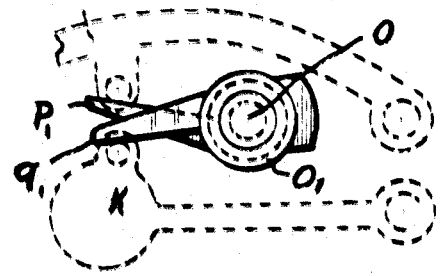

Figures 12, 13, 14 and 15 show in detail the device which produces the reciprocating movement, as follows: Figure 12 is a rear view partly in section, Figure 13 is a section on the line D—D of Figure 12 looking to the right thereof, Figure 14 is an axial section on the line E—E of Figure 12, and Figure 15 is an external side view of the rocker-shafts showing their connection with the oscillator and the reciprocating counterweight.

Figures 16 and 17 show an arrangement for the differential friction gearing between the camshaft and the film-driving shaft, which I name "differential corrector", as follows: Figure 16 is a section on the line I—I of Figure 17 and view of the mechanisms behind this section, and Figure 17 is a polygonal section, on the line F—G—H of Figure 16.

Figures 18, 19 and 20 show diagrammatically and partly in section, plan views of three different alternative devices of the differential friction gearing shown in Figures 16 and 17.

The same letters and numbers denote the same parts throughout the drawings.

*General description of the mechanism for a cine-projector*

Figure 1:
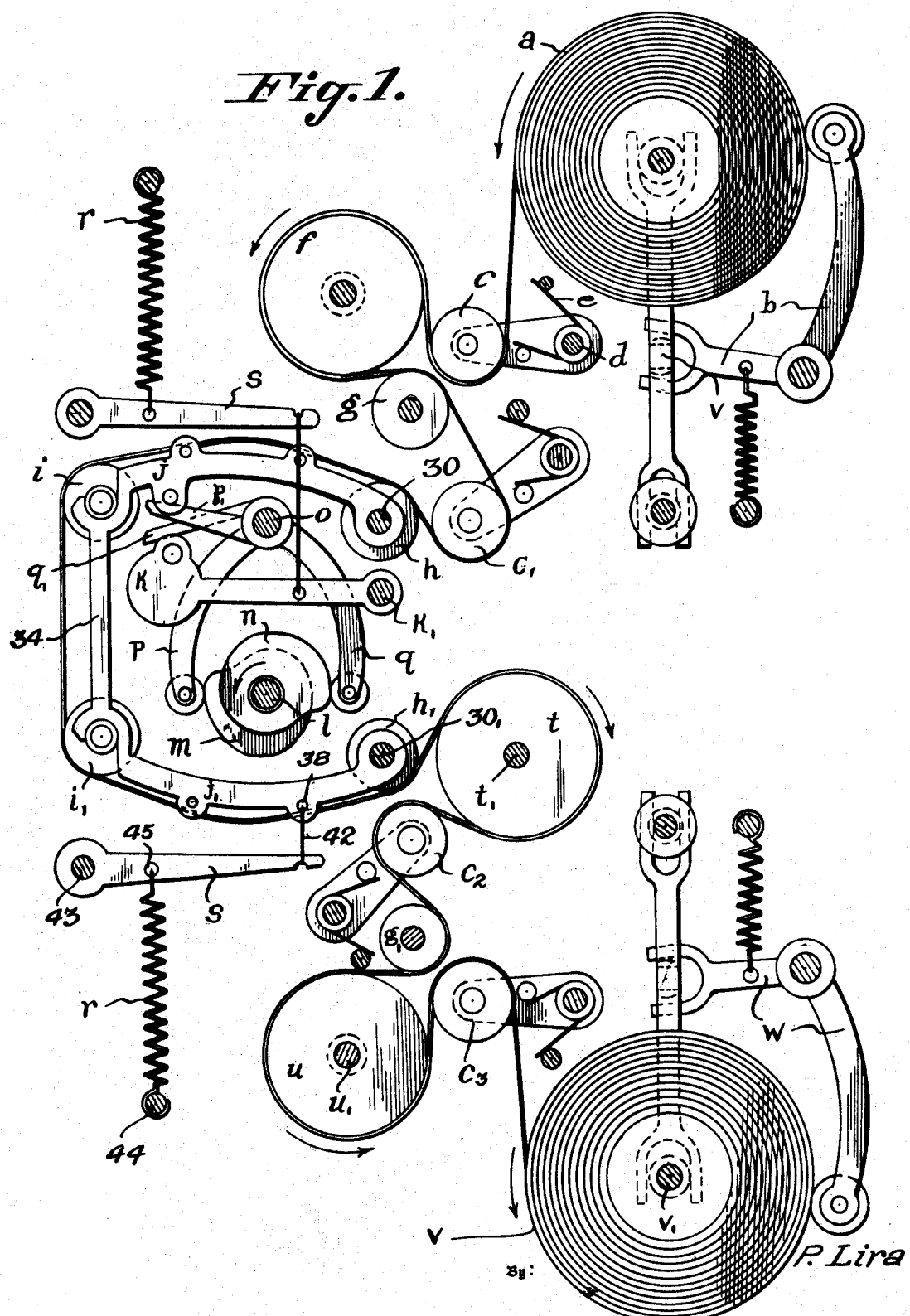
Figure 1 shows a general diagrammatic side elevation of the mechanism for a cine-projector, without indication of the means for the transmission of the movement.

In Figure 1:

$a$ is an unwinding reel with the film to be projected.

$b$ is a braking mechanism acting against the unwinding reel $a$ so that this reel delivers the film under a constant tensile stress. This mechanism is the same as described in my Patent No. 1,992,706.

$c$ is a tension roller supported by an arm free to pivot on the fixed shaft $d$, for regulating the tension of the film actuated by means of a spring $e$.

$f$ is a roller provided with a braking mechanism which is shown hereinafter in detail and the object of which is to increase in a constant amount the tensile stress with which the film is delivered by the unwinding reel. I name this device "tension increaser".

$c_1$ is a tension roller similar to the tension free roller $c$.

$h$, $h_1$ are free rollers with fixed shafts, which I will name "oscillator incoming roller" and "oscillator outgoing roller" respectively.

$i$, $i_1$ are the free rollers of the reciprocating film carrier, which rollers are connected, by means of rigid oscillating frames or yokes $j$ and $j_1$, to the fixed shafts of the free rollers $h$ and $h_1$ respectively.

$k$ is a pair of reciprocating counterweights having a fixed shaft $k_1$ and arranged symmetrically on both sides of the reciprocating film carrier.

$m$ and $n$ are two cams mounted on a common shaft $l$.

$o$ is a pair of concentric rocker-shafts connected with the cams $m$ and $n$ by means of the rocker-arms $p$ and $q$ respectively, and with the reciprocating film carrier and the reciprocating counterweights $k$ by means of the rocker-arms $p_1$ and $q_1$ respectively Fig. 14.

$r$, $r$ are springs under tension normally tending to force a contact between the oscillator and the rocker-arm $p_1$, and between the reciprocating counterweights $k$ and the rocker-arms $q_1$ respectively.

$s$, $s$ are lever arms for transmitting the action of the springs $r$ to the reciprocating film carrier and the reciprocating counter-weights respectively.

$t$ is a pulley fixed on a shaft $t_1$ rotation of which produces a continuous and uniform driving of the film simply by adherence. I name it "driving pulley".

$c_2$ is a tension roller similar to the tension roller $c$.

$g_1$ is a free roller with a fixed shaft.

$u$ is a roller actuated by a dragging mechanism which will be shown hereinafter in detail and the function of which is to decrease in a constant amount the tensile stress of the film, so that it goes to the rewinding reel with lesser tension than it had when passing over the driving pulley $t$. I name this device "tension decreaser".

$c_3$ is a tension free roller similar to the tension roller $c$.

$v$ is the rewinding reel mounted on a shaft V.

$w$ is a device the function of which is to regulate the force of a dragging mechanism acting over the rewinding reel $v$ so that it rewinds the film under a constant tensile stress. This mechanism is the same as described in my Patent No. 1,992,706.

There must be a general support of the mechanisms which I will name "projector frame part", and for the sake of clearness all the shafts of Figure 1 which are directly supported by said projector frame part have been hatched.

Figure 2:
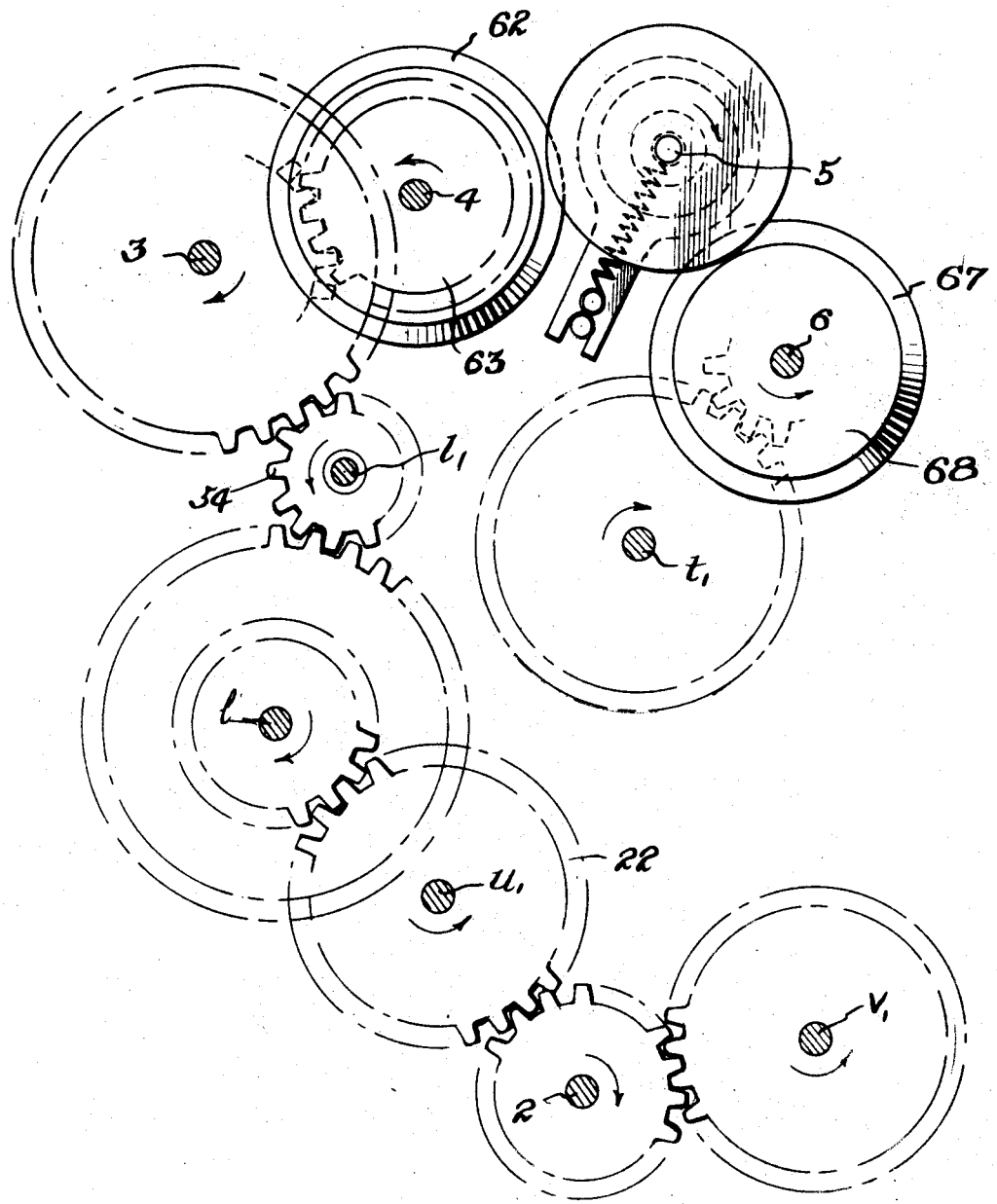
Figure 2 shows diagrammatically the transmission of the motion corresponding to the cine-projector mechanism shown in Figure 1.

The means for the transmission of movements in the mechanism are shown in Figure 2 and are described as follows:

The cam-shaft $l$, which also forms the power shaft, is geared to the intermediate shafts $l_1$ and $3$ serving for reducing the rate of rotation.

The shaft $l$ is geared to the shaft $u_1$ which is the shaft of the "tension decreaser" device $u$.

The shaft $u_1$ is geared by means of the intermediary shaft $2$ to the shaft $v_1$ of the rewinding reel.

The object of the shaft $2$ is to reverse the sense of rotation so that the shafts $u_1$ and $v_1$ rotate in the same sense.

The shaft $3$ is geared to shaft $4$ which has a conic pulley thereon and is friction geared to shaft $5$ which has a friction pulley $63$ Fig. 17; this friction pulley is geared to a conic pulley on shaft $6$, and finally shaft $6$ is geared to the shaft $t_1$ of the film driving pulley $t$.

The assembly of shafts $4$, $5$ and $6$ Fig. 16 forms a device which I name "differential corrector" and is described hereinafter in detail. The object of this device is to change at will the gear ratio between the camshaft $l$ and the driving pulley shaft $t_1$, so that the running of the film may be regulated to the smallest possible differences in the distance between the centers of successive frames or pictures in said film, due to the expansion or to the shrinking of the celluloid.

Working of the mechanism

The film comes out of the unwinding reel $a$ and runs successively over the tension roller $c$, the pulley $f$ of the tension increaser device, the free roller $g$, the tension roller $c_1$, the oscillator incoming roller $h$, the oscillator upper frame $j$, the oscillator upper roller $i$, the oscillator lower roller $i_1$, the oscillator lower frame $j_1$, the oscillator outcoming roller $h_1$, the driving pulley $t$, the tension roller $c_2$, the free roller $g_1$, the pulley $u$ of the tension decreaser, the tension roller $c_3$, and finally goes to the rewinding reel $v$.

When the cam-shaft $l$ which is also the power shaft works, its movement is transmitted to the shaft $t_1$, $u_1$ and $v_1$ as described and shown.

The dragging mechanism set up on the shaft $v_1$ forces the rewinding reel to put the film in tension in order to coil it.

At the same time the unwinding reel $a$, which is provided with a brake, only permits the running of the film under the tensile stress which the mechanism $b$ is set for.

As a result of this simultaneous action of both reels: the unwinding reel which tries to retain the film and the rewinding reel which tries to coil it, the film is kept tensioned all along its way from the unwinding reel to the rewinding one, and it is more or less strongly applied on the surface of the successive rollers over which it passes.

When the film is running from the unwinding reel $a$ to the rewinding one $v$, the roller $f$, provided with a braking mechanism, acts by adherence on the film, and this action is added to the retaining action exerted by the unwinding reel, so that the tension of the film is greater after it has passed over said roller $f$ on its way to the rewinding reel than before it has passed over it. That is why I name this device "tension increaser".

In a similar way, the roller $u$, actioned by a dragging mechanism as stated before, acts by adherence on the film, and this action is added to the tensile action exerted by the rewinding reel, so that the tension of the film is stronger before it passes over said roller $u$ on its way to the rewinding reel than after it has passed over it. That is why I name this device "tension decreaser".

Summing up the above explanations, when the whole mechanism is working and the film is running from the unwinding reel to the rewinding one, the tensile stress of said film is as follows:

(a) From the unwinding reel to the entrance of roller $f$ the tensile stress has the constant value which the regulating device $b$ has been set for.

(b) From the exit from the roller $f$, when passing over the oscillator and over the driving pulley $t$, to the entrance of the roller $u$, the tensile stress is greater than in the preceding part of its run owing to the tension increasing effect exerted by roller $f$.

(c) From the exit from roller $u$ to the rewinding reel, the tension of the film is weaker than in the preceding part of its run, owing to the tension decreasing action exerted by roller $u$, and said tension of the film has the constant value which the regulating device $w$ has been set for.

If the tension regulating devices of the mechanism, acting over both reels and over the rollers $f$ and $u$, are properly set, a nearly equal tension of the film at its entrance and at its exit of the driving pulley $t$ may be permanently reached, and if so, the film is forced to run at the same rate as the peripherial speed of said pulley $t$, on account of the adherence between the film and the pulley due to the tension of said film.

Moreover, if small differences in the tension of the film at its entrance and at its exit from the pulley $t$ should exist, the film will always accompany the pulley without sliding over it so far as the difference of tension aforesaid does not surpass the force of adherence between the film and pulley $t$.

Therefore the speed of the film in its uniform and continuous running from the unwinding reel to the rewinding one, is equal to the peripherial speed of the driving pulley $t$ and is ruled by it.

At the same time the cams $m$ and $n$ mounted on shaft $l$ imparts reciprocating movements to the oscillator and to the counterweights $k$ through the rocker arms $p$—$p_1$ and $q$—$q_1$ mounted on the concentric rocker-shafts $o$.

The cams $m$ and $n$ are so designed and disposed on the camshaft $l$ that the velocities of both reciprocating movements are always opposite, so that the reactions of inertia due to the reciprocating movements of the oscillator and the counterweights $k$, which are supported by the concentric rocker-shafts $o$ through the rocker arms $p_1$ and $q_1$, are opposed to one another and their resultant is of no account.

The shape of the cam $m$ is designed in such a way that the upwards speed of the oscillator is exactly the same, but opposite in direction, to the relative speed with which the film is running down through it. In this way, and owing to the composition of the film relative speed (downwards) with the oscillator dragging speed (upwards) an absolute stop of the film comprised between rollers $i$ and $i_1$ is produced during every upward stroke of the oscillator.

During the downward stroke of the oscillator, the uniform relative speed of the film (always downwards) is added to the oscillator speed in the same direction, thus producing a fast absolute movement of the film downwards, which lasts till the end of the downward stroke of the oscillator. Therefore successive stops and runs of the film through the field comprised between rolls $i$ and $i_1$ are obtained, at the rate of a stop and a run per each complete reciprocating movement of the oscillator.

Several tension rollers $c$, $c_1$, $c_2$ and $c_3$ are disposed along the path of the film and their object is to avoid any sudden variation of the film tension on account of accidental causes.

*Improvements in the lateral guiding of the film*

This improvement consists in the elimination of the lateral flanges in all the rollers and pulleys over which the film passes, with the sole exception of the first tension roller $c$.

Even the reels are devoid of the usual flanges for encasing, laterally, the coiled film, and are practically reduced to their core.

So that the only lateral guide for the film is provided by the lateral flanges of the free roller $c$; in the rest of its way the film is allowed to select its path freely under the action of the tension to which it is submitted.

The flanges are eliminated to prevent sudden changes in the tension of the film produced by the friction between the flanges and the film; moreover experience has shown such flanges are unnecessary.

*Improvements in the continuous and uniform driving of the film*

The driving mechanism described in my Patent No. 1,992,706 is improved by the addition of the "tension increaser" and the "tension decreaser" devices, as shown in Figure 1 and described in the present specifications.

The new, entire driving device is substantially defined by the joint incorporation of the following features:

(a) A brake acting over the unwinding reel, fitted with means for regulating its breaking force so that the reel delivers the film under a constant tension or nearly so.

(b) Means for increasing the tension of the film at a constant amount; said means being inserted in the path of the film before it passes over the oscillator and the driving pulley.

(c) A single pulley driving the film by adhesion.

(d) Means for decreasing the tension of the film at a constant amount; said means being inserted in the path of the film after it has passed over the oscillator and the driving pulley.

(e) A dragging brake acting over the rewinding reel, fitted with means for regulating its dragging force so that the reel rewinds the film under a constant tension or nearly so.

The advantages of this dragging device over the one described in my Patent No. 1,992,706, are as follows:

1st. The film passes over the oscillator and over the driving pulley with a greater tension; therefore the actual path of the film coincides more strictly with the theoretical one, and the adherence of the film over the driving pulley is also increased.

2nd. The friction between the film and the flanges of roller $c$ is variable and therefore produces fluctuations in the tension of the film; other fluctuations of said tension are due to the never perfect working of the tension regulating devices acting over both reels. Now, as the tension of the film when passing over the driving pulley is greater by a constant amount than when it passes over roller $c$ or when it goes out or in the reels, it follows that the fluctuations of the film tension at its entrance or its exit of the driving pulley $t$ are lower if stated in "per cent".

*The tension increaser device*

Figure 3:
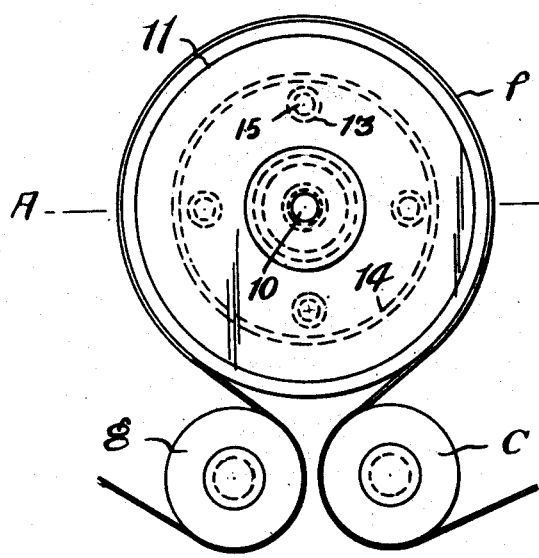
Figures 3 and 4 show in detail a device for increasing the tension of the film, which I name "tension increaser", as follows.
Figure 4:
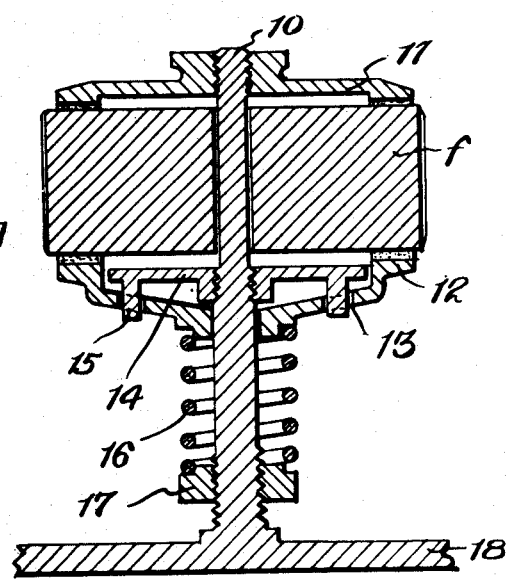

Reference is made to Figures 3 and 4.

$f$ is the roller free to revolve around shaft 10 which is fixed to the projector frame part 18.

Roller $f$ is interposed between two braking parts 11 and 12; the outer braking part 11 is screwed on shaft 10 and remains fixed to it; the inner braking part 12 has several perforations 13 and is free to move lengthwise along the shaft 10.

A disc 14 fixed on shaft 10 is provided with several studs 15 which engage in the perforations 13 of braking part 12, which therefore cannot revolve around shaft 10.

A spring 16 having one of its ends supported by a nut 17 screwed on shaft 10 and its other end applied to braking part 12 forces said braking part 12 to press roller $f$ against the fixed braking part 11.

Therefore and accordingly to the rules of mechanics, when roller $f$ rotates around shaft 10 it is submitted to a constant braking torque, no matter what the rate of rotation is.

The working of the device is as follows: When the film, passing over the roller $f$, is running from the unwinding to the rewinding reel, the adherence between the roller and the film forces said roller to revolve around shaft 10. The braking torque, created by this movement as stated, is overcome by the action of the film on roller $f$; hence there must be a difference between the tensions of the film at its entrance and at its exit of roller $f$, and the value of said difference of tensions multiplied by the radius of roller $f$ is equal to the braking torque according to the rules of mechanics.

Now, as the radius of roller $f$ and the braking torque are constants as stated before, it follows that, so far as the film is running and whatever its speed, the difference between the tensions of said film at its entrance to and at its exit from roller $f$ is also constant.

By tightening or unscrewing nut 17 on shaft 10 the pressure of spring 16 against the braking part 12 may be regulated so as to get the desired braking torque.

Rollers $c$ and $g$ are disposed so as to obtain as large a contact as possible between the film and the roller $f$.

The tension decreaser device

This device works on the same principle as the one described for the tension increaser, and is similar to it. Its only difference consists in the disposition of the braking parts, which is made in order to drag the roller by friction instead of braking it.

Figure 5:
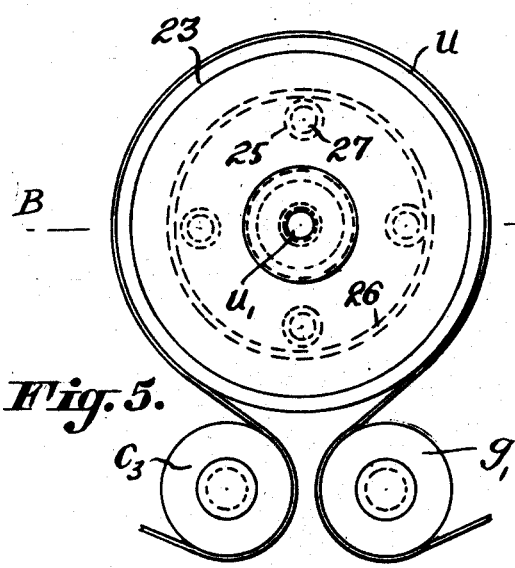
Figures 5 and 6 show in detail a device for decreasing the tension of the film, which I name "tension decreaser", as follows
Figure 6:
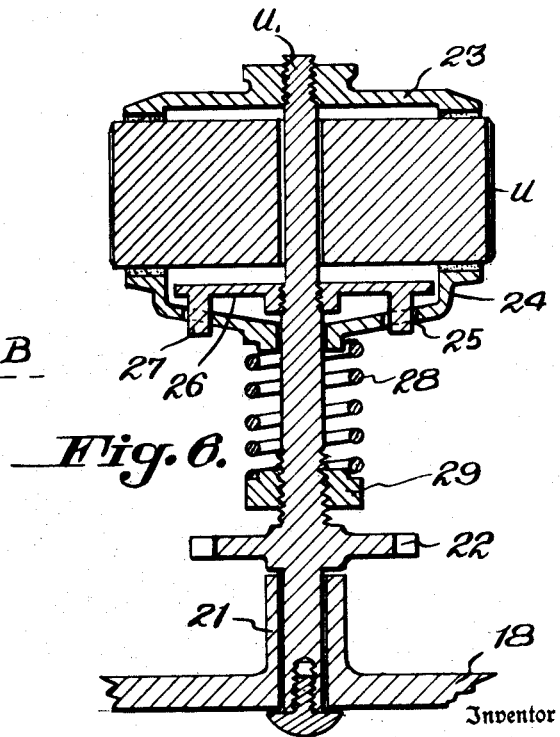

Reference is made to Figures 5 and 6.

Shaft $u_1$ having a gear 22 thereon is free to rotate in its bearing 21 which is fixed on the projector frame part 18. By means of gear 22 shaft $u_1$ is geared to power shaft $l$ as shown in Figure 2.

Roller $u$ is free to rotate around shaft $u_1$ and is interposed between two braking parts 23 and 24; the outer braking part 23 is screwed on shaft $u_1$ and remains fixed to it; the inner braking part 24 has several perforations 25 and is free to move lengthwise the shaft $u_1$.

A disc 26 fixed on shaft $u_1$ is provided with several stems 27 which engage in the perforations 25 of braking part 24, which therefore revolves all together with shaft $u_1$.

A spring 28 having one of its ends supported by a nut 29 screwed on shaft $u_1$ and its other end applied to braking part 24, for said braking part to press the roller $u$ against braking part 23.

The gear ratio of the transmission of movement to shaft $u_1$ is so adjusted that the rate of rotation of said shaft is greater than the rate of rotation imposed to roller $u$ by the adherence of the running film; therefore a continuous sliding of roller $u$ between the braking parts 23 and 24 ensues and, according to the rules of mechanics, when the mechanism is at work the braking parts 23 and 24 exert a constant dragging torque over roll $u$, no matter what the rate of rotation is.

The dragging torque exerted by braking parts 23 and 24 over roller $u$ is balanced by a difference between the tensions of the film at its entrance and at its exit of said roller; the difference between both tensions is constant and the same as the torque, and the tension at the entrance to roller $u$ is greater than the tension at its exit.

By either tightening or unscrewing nut 29 on shaft $u_1$ the pressure of spring 28 against the braking part 24 may be regulated so as to get the desired dragging torque.

Rollers $g_1$ and $c_3$ are disposed so as to obtain as large a contact between the film and the roller $u$ as possible.

Improvements in the oscillator device

Reference is made to Figures 7, 8, 9, 10 and 11, which show a new and improved design of the parallel oscillator described in my Patent No. 1,992,706.

$h$ is the incoming roller and $h_1$ is the outgoing roller of the oscillator; both rollers are supported by parallel shafts 30 and 30$_1$ fixed on the projector frame part 18.

The upper roller $i$ of the oscillator is supported by a rigid frame $j$ which is free to oscillate around the upper shaft 30 of roller $h$ and has in its upper part two transversal bars 31 which carry a convex film support 32.

The lower roller $i_1$ of the oscillator is supported by a rigid frame $j_1$ which is free to oscillate around shaft 30$_1$ of roller $h_1$ and has in its lower part two transversal bars 35 which bear a convex film support 36.

Two parallel connecting rods 34 are arranged on both sides of the frame $j$ and $j_1$; these connecting rods are journaled at the upper end on journals 33 of the rigid frame $j$, and at its lower end on journals 37 of the lower frame $j_1$.

Rods 34 are transversally connected by a bar 39 intended to receive the action of rocker arm $p_1$.

38 are journals on both sides of frame $j_1$ and are intended to receive the action of springs $r$ 35 (shown in Figure 1 only).

The substantial improvement in the device here described over the "parallel oscillator" shown in my Patent No. 1,992,706 consists in the addition of the film supporting parts 32 and 36.

Part 32 is shown in detail in Figures 10 and 11; said part is simply supported by, but not fastened on bars 31, so it is free to move laterally.

Lateral flanges 41 on the supporting bridge or part 32 are not intended for guiding the film, but on the contrary they are provided in order to allow the film to move part 32 laterally over its supporting bars 31 if its free running so requires.

Projecting supports 40 are provided on both sides of the bridge or part 32 for directly supporting the film by its sides in order to prevent any injury to the central printed portion thereof.

The film is pressed lightly over supports 40 owing to its tension, and slides over them when running.

The object of film supports 32 and 36 on oscillating frames $j$ and $j_1$ is to prevent the vibrations of the film, which inertia and air resistance tend to produce owing to the reciprocating movement.

Device for applying the spring action to the oscillator

Accelerations of the oscillator reciprocating movement in cine-projectors are very great, and if the springs tending to force a contact between the oscillator and the rocker arm are directly applied to said oscillator, they lose a considerable portion of their strength, which is absorbed by their own inertia, thus making it difficult to attain the necessary rate of movement suitable for a good projection. The object of the device herein described is to avoid said difficulty.

Reference is again made to Figure 1.

r at the lower end of the figure is a spring having one of its ends supported by a fixed stem 44 and its other end connected to lever-arm s at point 45.

Lever arm s pivots at one of its ends over fixed support 43 and is connected at its other end by means of link 42 to stem 38 on the reciprocating frame $j_1$.

Point 45 is nearer to support 43 than to link 42, and in a similar way stem 38 is nearer to the fixed shaft 30₁ of roller $h_1$ than reciprocating roller $i_1$; from the former relations of position it follows that the movements of the spring end at 45 are a small fraction only of the reciprocating movements of roller $i_1$; and that the accelerations of the spring end are the same fraction of accelerations of roller $i_1$.

Counterbalance of reciprocating movements

The object of this device is to prevent strong periodical reactions on the bearings of rocker shaft O and cam-shaft $l$, produced by the oscillator movement on account of inertia.

To reach this object a pair of reciprocating counterweights k are arranged symmetrically at both sides of the oscillator in order to counterbalance the inertia forces developed by its reciprocating movement.

Reference is made to Figures 12, 13, 14 and 15.

Camshaft $l$ has two cams m, n, and a gear 54. Gear 54 is provided for gearing shaft $l$ to the rest of the mechanism as shown in Figure 2.

O and O₁ are two concentric rocker shafts. The outer shaft $o_1$ has a rocker arm p in contact with cam m and a rocker arm $p_1$ Fig. 15 in contact with the oscillator. So that the shaft O₁ serves for transmitting the reciprocating movement created by cam m through the rocker arms p and $p_1$ to the oscillator.

The inner shaft O has a rocker arm q in contact with cam n and two rocker arms $q_1$ Fig. 15 in contact with the reciprocating counterweights k disposed at each side of the oscillator. So the shaft O serves for transmitting the reciprocating movement created by cam n through the rocker arms q and $q_1$ to the reciprocating counterweights k.

50 and 51 are small rollers at the end of rocker arms p and q respectively.

Cams m and n are so designed and arranged on camshaft $l$ that the velocities of the oscillator and the reciprocating counterweights are always equal in value but opposite in direction.

The mass of the reciprocating counterweights k is settled in order to produce the same inertia reactions as the oscillator at the same velocities.

Owing to the former dispositions the inertia reactions of the oscillator on rocker arm $p_1$ are always equal in value but opposite in direction to the resultant of the inertia reactions of counterweights k on rocker arms $q_1$.

In a similar manner the pressure of rollers 50 and 51 on cams m and n respectively, are equal in value but opposite in direction.

From the former statements it follows that the main forces applied to both the cam-shaft $l$ and the assembly of rocker-shafts O and O₁ are balanced.

Secondary transversal torques due to the separation or distance between cams m and n subsist; but if said cams are set near one another, said torques are of no account.

Differential corrector

The object of this mechanism is to allow small and exact changes of the gear ratio between the camshaft $l$ and the driving-pulley shaft $t_1$.

Reference is made to Figures 16 and 17.

Shaft 4 is supported by the projector frame part 18 and is screwed to it at 60 so that it may be shifted up or down along its axis by means of handle 61.

Mounted on shaft 4 but free to revolve around it, is a conic pulley 62 fitted with a gear 63 which receives the movement imparted by camshaft $l$ (as shown in Figure 2).

A spring 64 supported at one of its ends by a nut 65 fixed on shaft 4, applies its other end to the thrust collar 66 so that all axial play of conic pulley 62 on its supporting shaft 4 is prevented.

Shaft 6 having a conic pulley 67 and a gear 68 fixed thereon, is supported by the projector frame part 18 and is pressed against it at its end 70 by means of a spring 69 applied at its other end so that all axial play of the shaft on its support is prevented.

Gear 68 serves for transmitting the movement to the driving pulley shaft $t_1$ (as shown in Figure 2).

The intermediary shaft 5 ends in a disc 74 enclosed in a box 75 which lets it free to any transversal displacement but not to axial ones.

The supporting box 75 has on its lower part a screw 78 threaded into a nut 79 which is supported by the projector frame part 18 and may be turned by means of a handle 80.

Box 75 has also a projecting arm terminating in a fork which engages a fixed lug 77, so that when nut 79 is turned, screw 78 and box 75 move upwards or downwards along their axis without turning.

An extension stem 81 on screw 78 passes through the handle 80 of nut 79 in order to show the position of box 75.

A friction disc 71 is mounted around shaft 5 by means of suitable bearings 72 and 73.

Finally a spring 76, acting over shaft 5, presses the friction disc 71 against the conic pulleys 62 and 67.

It is important that the diameter of the conic pulleys 62 and 67 be different, so that the radius of the circles in said pulleys which are simultaneously in contact with friction disc 71 be always different.

The working of the differential device is as follows:

When the mechanism is running and handle 80 is turned, the radii of the circles in the conic pulleys 62 and 67 which come in contact with the intermediary friction wheel 71 are both simultaneously increased or decreased; so, the gear ratio in the transmission of movement from shaft 4 to shaft 6 suffers simultaneously an increment and a diminution, but as these variations are not equal owing to the difference in the diameters of conic pulleys 62 and 67, a final differential change in the gear ratio of the transmission of movement follows.

The principle upon which the device described works is the same as in the "differential corrector" shown in my Patent No. 1,992,706. The substantial differences between the same and the device herein described are:

1st. The use of two conic pulleys connected by means of an intermediary friction wheel instead of two friction wheels connected by an intermediary conic pulley.

2nd. The use of thrust bearings on shafts 4 and 6 for preventing any axial play of the conic pulleys 62 and 67.

*Alternative embodiments of the differential corrector*

The use of two conic pulleys in combination with friction wheels in order to produce differential changes in the transmission gear ratio admit many alternative embodiments of which three are shown in Figures 18, 19 and 20.

In all of said modifications the same principle of differential change in the gear ratio by means of an increment simultaneous with a diminution in the rate of movement is applied.

Referring to Figure 18:

90 is a conic pulley geared to camshaft $l$ by means of gear 91.

97 is a conic pulley geared to the driving pulley shaft $t_1$ by means of gear 98.

Wheels 92 and 94 on shafts 93 and 95 are friction geared to conic pulleys 90 and 97 respectively.

Intermediate shafts 93 and 95 are geared at 96.

By means of handle 100 the screw 99 moves simultaneously upwards or downwards the friction wheels 92 and 94 through shafts 93 and 95. From the simultaneous movements so produced follows the gear ratio differential change.

Referring to Figure 19:

Conic pulleys 101 and 107 are connected through the intermediate gear 106 by means of friction wheels 102 and 104 mounted on shafts 103 and 105 respectively.

By means of handle 109 a rocking lever 108 permits the shifting simultaneously of the shafts 103 and 105; and as the conic wheel 101 is reversed, the differential change in the gear ratio follows.

In the devices shown in Figures 18 and 19 the conic pulleys are pressed against the respective friction wheels, although the means for so doing are not shown in said figures for the sake of clearness.

Referring to Figure 20:

111 is a friction wheel connected through gear 112 to camshaft $l$.

116 is a conic pulley connected through gear 117 to the driving pulley shaft $t_1$.

On the intermediary shaft 115 are mounted conic pulley 113 and friction wheel 114 which transmit the movement from wheel 111 to conic pulley 116.

By means of handle 118, shaft 115 may be moved upwards or downwards thus producing the differential change of the gear ratio.

Having thus described my invention, what I claim as new and desire to secure by Letters Patent, is:

1. In a device of the class described, the combination of reels for supplying and rewinding a film, a frame projector part providing a mounting for said reels, means for effecting the intermittent movement of the film sections across the field of a lens, said means comprising a reciprocating film carrier allowing the film to run all its way in tension from the unwinding reel to the rewinding reel, means comprising a camshaft for producing a reciprocating movement of said film carrier, means for braking the unwinding reel, means for regulating the braking action over the unwinding reel so that said reel supplies the film at a nearly constant tension, means for dragging the rewinding reel, means for regulating the action of said dragging means over the rewinding reel so that said reel rewinds the film at a nearly constant tension, a shaft having a pulley thereon, over which pulley the film passes on its way from the unwinding reel to the rewinding reel, and against which pulley the film is pressed by its tension only, bearings fixed to the projector frame part for supporting said shaft, means for increasing in a constant amount the tension with which the film is delivered by the unwinding reel, said means being inserted in the path of the film before it passes over the reciprocating film carrier and the aforesaid pulley, a support fixed on the projector frame part for supporting said means, means for decreasing in a constant amount the tension with which the film comes out of the aforesaid pulley, said means being inserted in the path of the film after it has passed over the reciprocating film carrier and the aforesaid pulley, a bearing fixed on the projector frame part for supporting said means, and means for gearing the cam-shaft with the aforesaid pulley shaft, with the rewinding reel dragging mechanism and with the means for decreasing the tension of the film, whereby said mechanisms are operated together.

2. In a device of the class described, the combination with reels for supplying and rewinding a film and a projector frame part providing a mounting for said reels, of means for effecting the intermittent movement of the film sections across the field of a lens, said means comprising a reciprocating film carrier allowing the film to run all its way in tension from the unwinding reel to the rewinding reel, means comprising a camshaft for producing a reciprocating movement of said film carrier, a friction brake acting over the unwinding reel, means supplying the force for operating said brake, means for correlating the friction force of said brake with the diameter of the coil of film in the unwinding reel, so that said force decreases when said diameter decreases, means for dragging by friction the rewinding reel, means for supplying the force for producing the friction in said dragging means, means for correlating the dragging friction force acting over the rewinding reel with the diameter of the coil of film in said reel, so that said force increases when said diameter increases, a shaft having a pulley thereon, over which pulley the film passes on its way from the unwinding reel to the rewinding reel, and against which pulley the film is pressed on account of its tension only, bearings fixed on the projector frame part for supporting said shaft, means for increasing in a constant amount the tension with which the film is delivered by the unwinding reel, said means being inserted in the path of the film before it passes over the reciprocating film carrier and the aforesaid pulley, a support fixed on the projector frame part for supporting said means, means for decreasing in a constant amount the tension with which the film comes out of the aforesaid pulley, said means being inserted in the path of the film after it has passed over the reciprocating film carrier and the aforesaid pulley, a bearing fixed on the projector frame part for supporting said means, and means for gearing the cam-shaft with the aforesaid pulley shaft, with the rewinding reel dragging mechanism, and with the means for decreasing the tension of the film, whereby said mechanisms are operated together.

3. In a device of the class described, the combination with reels for supplying and rewinding a film, and a projector frame part providing a mounting for said reels, of means for running the film from the unwinding reel through the mechanism to the rewinding reel, said means comprising a single pulley driving the film by adherence, a reciprocating film carrier over which the film passes when passing across the field of a lens, means for producing the reciprocating movement of said film carrier, and means inserted in the path of the film before it passes over the reciprocating film carrier and the aforesaid driving pulley, said means comprising a shaft supported by the projector frame part, a large roller free to revolve around said shaft, over which roller the film passes on its way from the unwinding reel to the rewinding reel, a friction brake acting over said roller, means comprising a spring for supplying a constant force working said brake, whereby the aforesaid large roller is submitted to a constant braking torque, means for setting the acting force of said spring, whereby the desired braking torque is obtained, and two small free rollers over which the film passes before and after passing over the aforesaid large roller respectively, said two small rollers having their shafts parallel to the large roller shaft, and the three said rollers being disposed as near as possible between them, whereby the contact between the film and the large roller is as large as possible.

4. In a device of the class described, the combination with reels for supplying and rewinding a film, and a projector frame part providing a mounting for said reels, of means for running the film from the unwinding reel through the mechanism to the rewinding reel, said means comprising a single pulley driving the film by adherence, a reciprocating film carrier over which the film passes when passing across the field of a lens, means for producing the reciprocating movement of said film carrier, and means inserted in the path of the film after it has passed over the reciprocating film carrier and the aforesaid driving pulley, said means comprising a shaft free to revolve on bearings fixed to the projector frame part, bearings for said shaft, means for gearing said shaft with the aforesaid means for running the film whereby said mechanisms are operated together, a large roller free to revolve around said shaft, means for dragging by friction said large roller, said means being connected with the aforesaid shaft whereby they revolve together, means comprising a spring for supplying a constant force producing the friction in said dragging means, whereby the aforesaid large roller is submitted to a constant dragging torque, means for setting the acting force of said spring whereby the desired dragging torque is obtained, and two small free rollers over which the film passes before and after passing over the aforesaid large roller respectively, said two small rollers having their shafts parallel to the large roller shaft, and the three said rollers being disposed as near from one another as possible, whereby the contact between the film and the large roller is as large as possible.

5. In a device of the class described, the combination with reels for supplying and rewinding a film, and a projector frame part providing a mounting for said reels, of means for running the film from the unwinding reel through the mechanism to the rewinding reel, two parallel reciprocating free rollers over which the film passes when passing to and from the field of a lens, a free roller over which the film passes before passing over the first of said reciprocating rollers, a free roller over which the film passes after it has passed over the second of said reciprocating rollers, parallel shafts fixed on the projector frame part for supporting said two free rollers, two similar frames each one connecting one of said fixed shafts with one of the reciprocating-roller-shafts, said frames being free to oscillate around said fixed shafts, connecting rods for coupling said two frames, the arrangement and proportions of said two frames and connecting rods being such that the axes of the aforesaid four rollers are the edges of a parallelopiped, means for producing the reciprocating movement of the aforesaid reciprocating rollers through the aforesaid oscillating frames and connecting rods, and means for supporting the film, inserted in the path of said film between the aforesaid reciprocating rollers and the aforesaid free rollers, said means being supported by the aforesaid oscillating frames but not fastened on them so that they can move laterally, and said means having means providing a lateral contact with the film, whereby they move laterally following the lateral movements of the film.

6. In a device of the class described, the combination with reels for supplying and rewinding a film, and a projector frame part providing a support for said reels, of means for running the film from the unwinding reel through the mechanism to the rewinding reel, a reciprocating film carrier over which the film passes when passing across the field of a lens, means comprising a shaft having a cam thereon for producing a reciprocating movement, means comprising a rocker for transmitting said reciprocating movement from the cam to the reciprocating film carrier, and means for continuously forcing a contact between the reciprocating film carrier and the aforesaid rocker, said means comprising one or several springs, means for providing a support to said springs, one or several levers receiving at one point of them the action of said springs and connected at one of their ends to the reciprocating film carrier, whereby said levers are intermediary elements between the aforesaid springs and the reciprocating film carrier, means providing a fulcrum for supporting said levers, and means for connecting said levers to the reciprocating film carrier.

7. In a device of the class described, the combination with reels for supplying and rewinding a film, and a projector frame part providing a support for said reels, of means for running the film from the unwinding reel through the mechanism to the rewinding reel, a reciprocating film carrier over which the film passes when passing across the field of a lens, means for reciprocating said film carrier, one or several reciprocating counterweights, means for supporting said counterweights and for guiding their movement, and means for reciprocating said counterweights, the velocities of the reciprocating movement produced by said means and the mass of said reciprocating counterweights being so settled that the inertial reaction produced by them is always equal in value but opposite in direction to the inertial reaction produced by the reciprocating film carrier.

8. In a device of the class described, the combination with reels for supplying and rewinding a film, and a projector frame part providing a support for said reels, of means for running the film from the unwinding reel through the mechanism to the rewinding reel, a reciprocating film carrier over which the film passes when passing across the field of a lens, means for reciprocating said film carrier, one or several reciprocating counterweights, means for supporting said counterweights and for guiding their movement, and means for reciprocating said counterweights, the velocities of the reciprocating movement produced by said means and the mass of said reciprocating counterweights being so settled that the inertial reactions produced by them over the aforesaid means for reciprocating the counterweights are always equal in value but opposite in direction to the inertial reactions produced by the reciprocating film carrier over the aforesaid means for reciprocating it.

9. In a device of the class described, the combination with reels for supplying and rewinding a film, and a projector frame part providing a support for said reels, of means for running the film from the unwinding reel through the mechanism to the rewinding reel, a reciprocating film carrier over which the film passes when passing across the field of a lens, reciprocating counterweights arranged at both sides of the reciprocating film carrier, means for guiding the movement of said counterweights, means comprising a shaft having one or several cams thereon for producing reciprocating movements, means comprising a rocker shaft having rocker arms thereon for transmitting the reciprocating movement from one of the cams to the reciprocating film carrier, means comprising a rocker shaft having rocker arms thereon for transmitting the movement from one of the aforesaid cams to the aforesaid counterweights, the aforesaid two rocker shafts being concentrics, and the aforesaid cams and rocker-arms being so arranged and settled that the mass and velocity of the reciprocating counterweights produce inertial reactions on the concentric rocker shafts equal in value but opposite in direction to the inertial reactions produced by the reciprocating film carrier on them.

10. In a device of the class described, the combination with reels for supplying and rewinding a film, and a projector frame part providing a mounting for said reels, of means for running the film from the unwinding reel through the mechanism to the rewinding reel, said means comprising a shaft having a pulley thereon for driving the film, a reciprocating film carrier over which the film passes when passing across the field of a lens, means comprising a camshaft for producing the reciprocating movement of said film carrier, and means for gearing said camshaft with said film-driving pulley shaft, said means comprising: two intermediary transmission shafts having each a conic pulley thereon, one or two intermediary transmission shafts having each a narrow friction wheel thereon, every one of said conic pulleys being in contact with one of said narrow friction wheels, means for forcing a continuous contact under pressure between every conic pulley and its respective narrow wheel, whereby friction gearing is produced between them, means for gearing with the aforesaid camshaft, with the aforesaid driving-pulley shaft, and between them the transmission shafts which are not friction geared between them, means for supporting the aforesaid transmission shafts in connection with the projector frame part, means for shifting one or two of the aforesaid intermediary transmission shafts, a control for said shifting means, said shifting means and their control being so arranged that by a single movement of the control a simultaneous displacement of every one of said narrow friction wheels over its respective conic pulley is obtained, whereby two changes in the gear ratio are simultaneously produced, and, finally, the direction of the conicity in the aforesaid conic pulleys and their diameters being so settled that the aforesaid two changes in the gear ratio are different in value, and besides it, when one of them increases the whole transmission gear ratio, the other decreases it, whereby a resultant differential change in the gear ratio of the whole transmission follows.

11. In a device of the class described, the combination with reels for supplying and rewinding a film, and a projector frame part providing a mounting for said reels, of means for running the film from the unwinding reel through the mechanism to the rewinding reel, said means comprising a shaft having a pulley thereon for driving the film, a reciprocating film carrier over which the film passes when passing across the field of a lens, means comprising a camshaft for producing the reciprocating movement of said film carrier, a transmission shaft geared to the aforesaid camshaft, means for gearing said shafts, a conic pulley mounted on said transmission shaft, a transmission shaft geared to the aforesaid film-driving pulley shaft, means for gearing said shafts, a conic pulley mounted on said second transmission shaft, one of said conic pulleys being shiftable along its axis, means for shifting said shiftable conic pulley, means in connection with the projector frame part for supporting said two transmission shafts, an intermediary transmission shaft, means in connection with the projector frame part for supporting said intermediary shaft, a narrow friction wheel mounted on said shaft and free to revolve around its axis, said narrow friction wheel being shiftable along its axis, means for forcing a continuous contact under pressure between said narrow friction wheel and the aforesaid two conic pulleys, whereby friction gearing is secured between them, the diameters of said conic pulleys being so disposed that their conicity is in the same direction and the circles in simultaneous contact with the narrow friction wheel are always different, means for shifting the aforesaid narrow friction wheel so that the diameter of the contact circles between said wheel and the conic pulleys are simultaneously diminished or enlarged, and means comprising thrust bearings or equivalent means for preventing any axial play of the aforesaid conic-pulley shafts on their supports or bearings.

PEDRO LIRA.